Oct. 6, 1964
H. G. THOMPSON
3,151,684
PLOW STANDARD OVERLOAD RELEASE
Original Filed March 5, 1958
3 Sheets-Sheet 1
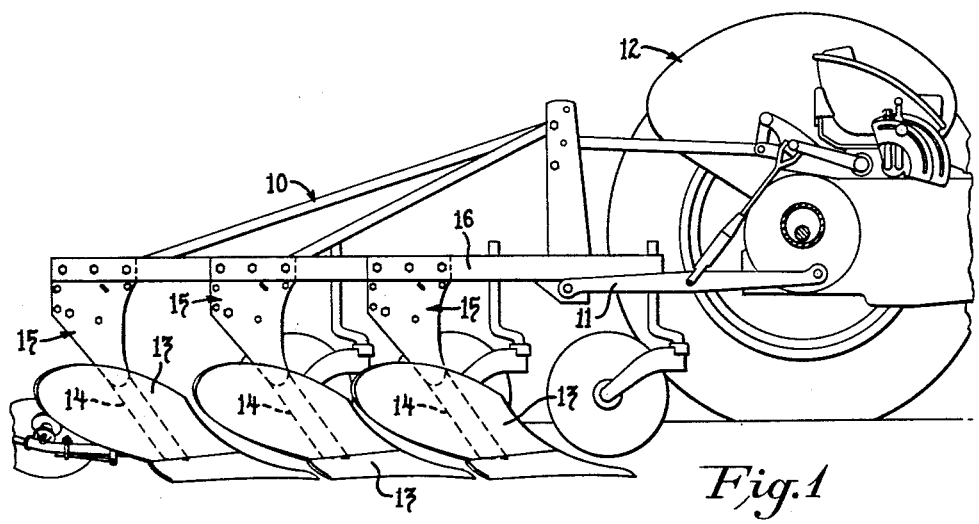
Fig.1
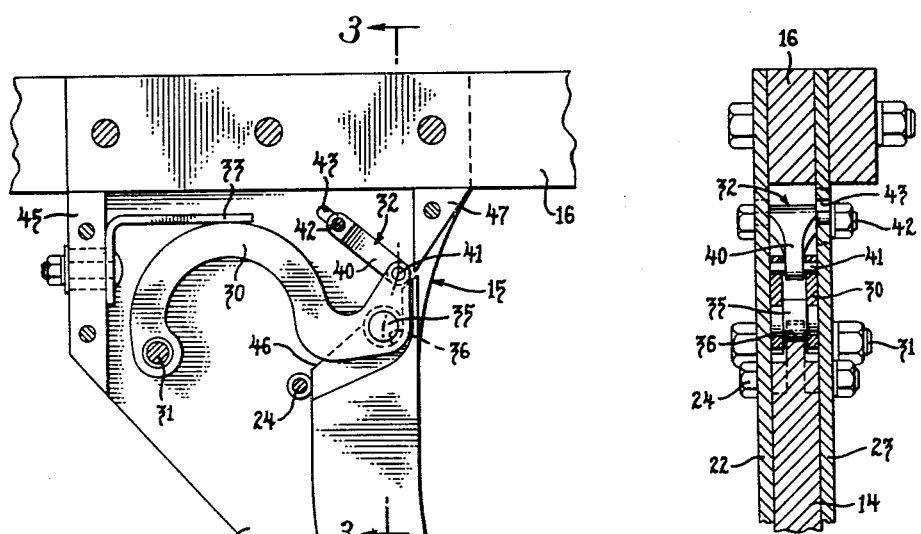
Fig.2
Fig.3
INVENTOR.
HOWARD G. THOMPSON
BY
ATTORNEYS.

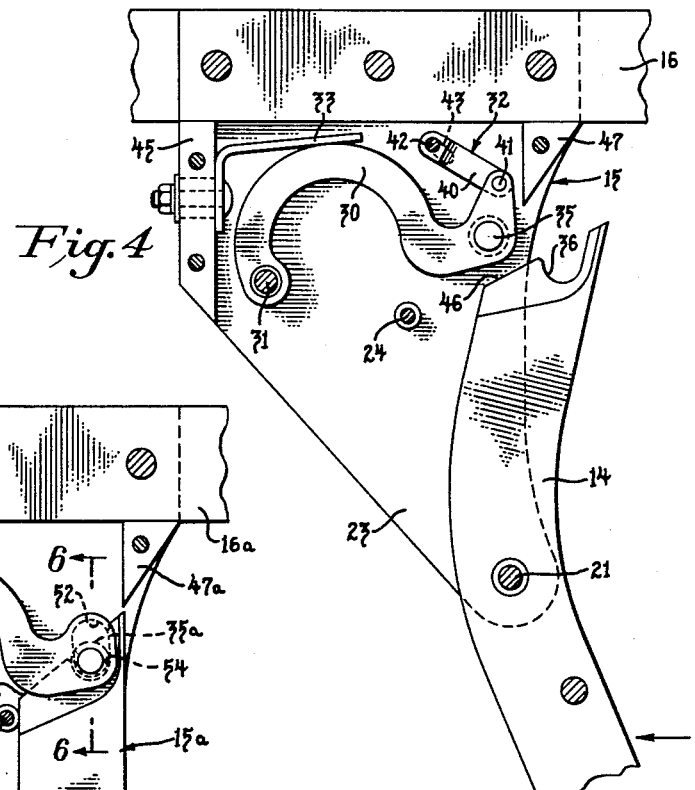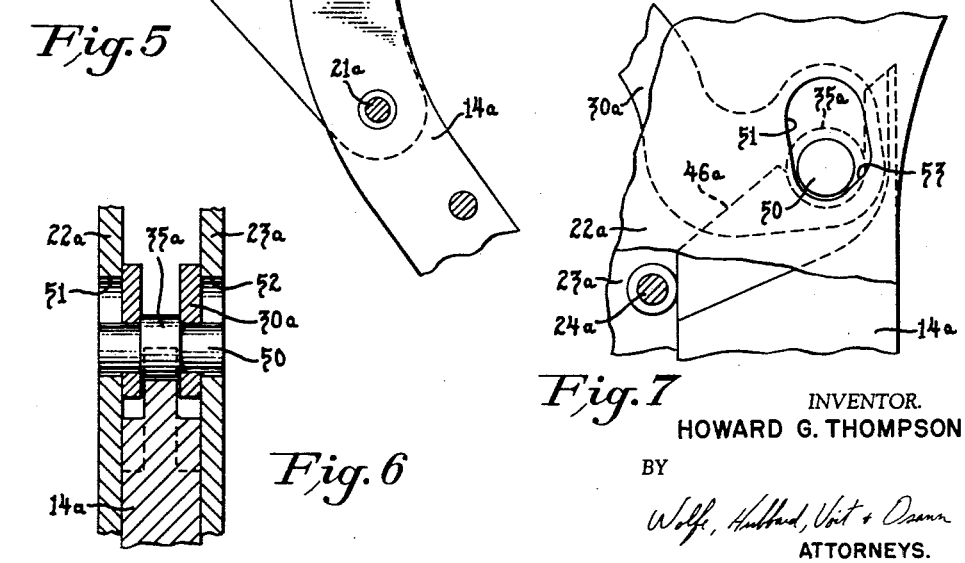

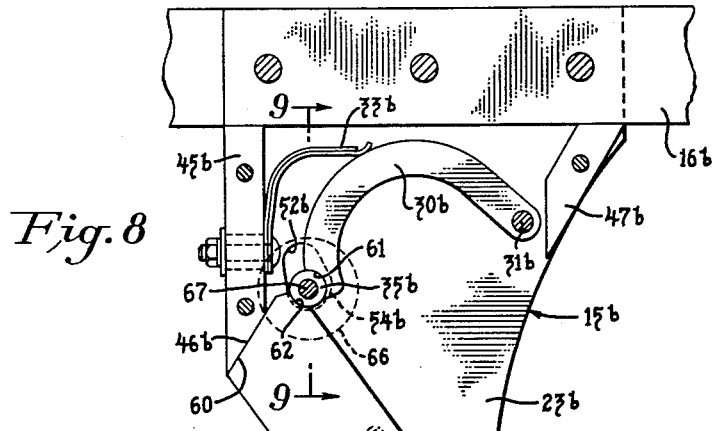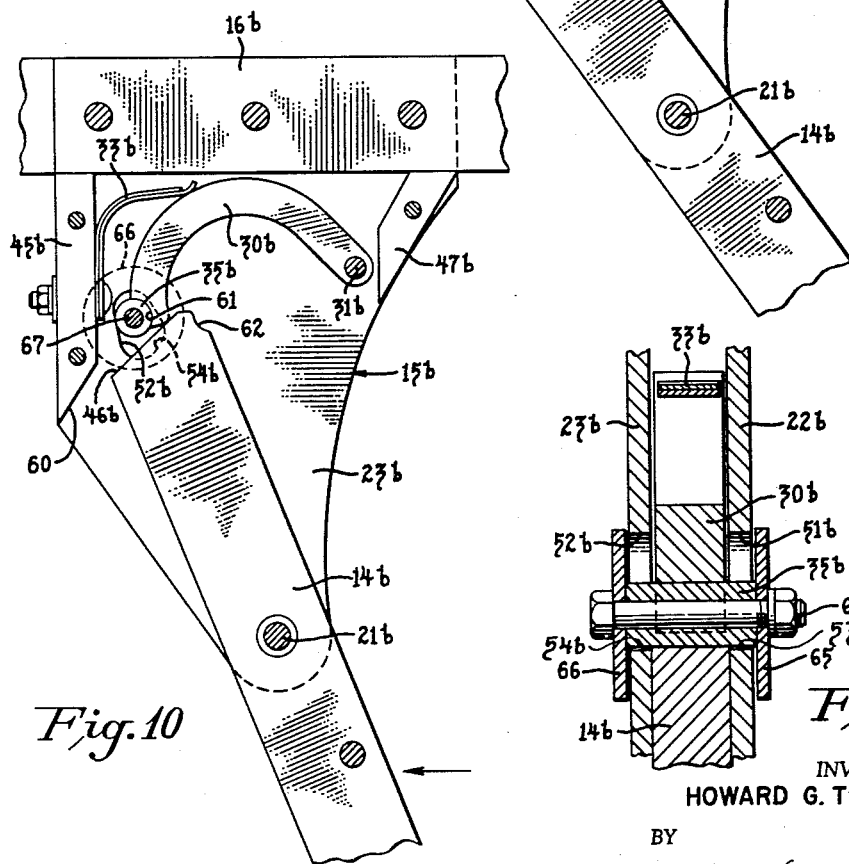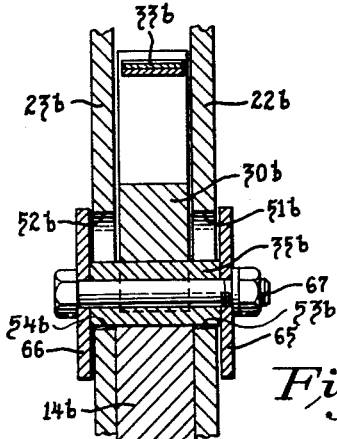

3,151,684
PLOW STANDARD OVERLOAD RELEASE
Howard G. Thompson, Detroit, Mich., assignor to Massey-Ferguson Inc., Detroit, Mich., a corporation of Maryland
Original application Mar. 5, 1958, Ser. No. 719,323, now Patent No. 3,061,019, dated Oct. 30, 1962. Divided and this application Dec. 26, 1961, Ser. No. 161,976
3 Claims. (Cl. 172—269)

This application is a division of my application Serial No. 719,323, filed March 5, 1958, now Patent No. 3,061,019, issued October 30, 1962.

The present invention relates generally to agricultural implements such as multi-bottom plows and more particularly to a release mechanism for disabling a tool such as a plow bottom when it strikes an obstruction.

Modern farming practice tends toward utilizing larger, multiple-tool farm implements mounted on, and operated by, larger more powerful tractors. Through the use of a multi-bottom or gang plow pulled by a large tractor, for example, a farmer can materially increase his plowing speed and efficiency.

This mode of operation aggravates the problem of avoiding damage to a plow bottom or like tool when it is drawn into contact with underground obstructions. This is because the increase in draft load caused by a single plow bottom striking an underground rock is slight compared to the total force normally exerted on a tractor by a multi-bottom plow. Thus, a powerful tractor will continue to pull the implement forward and the obstructed plow bottom will be severely damaged unless it is disabled or released.

It is, therefore, the general aim of the invention to provide a novel overload release mechanism for an agricultural implement that is simple, reliable, and economical to manufacture and which operates at an exact, predetermined release loading, even after long periods of non-use, while permitting the implement to be easily relocked in an operating position by a light force.

It is a further object to provide a mechanism as described above that is sturdy and trouble-free in that it utilizes only a few simple parts located so as to be protected and shielded.

With more particularity, it is an object to utilize a pivoted, U-shaped deflection member as an economical latch providing a strong, resilient latching force, positive release at an exactly pre-determined load, and easy relocking after release.

In one of its aspects, it is an object to provide a mechanism of the above type with an extremely simple and accurate release cam for assuring positive latch release at a desired loading.

Moreover, it is an object to provide a safety release mechanism as characterized above which may be installed as an integral part of an implement at little additional cost and thereafter relied upon to function effectively when needed without requiring constant checking and maintenance.

Other objects and advantages of the invention will become apparent upon reading the attached, detailed description and upon reference to the drawings in which:

FIGURE 1 is an elevation of a multi-bottom plow, utilizing overload release mechanisms of the present invention, which is attached to an operating tractor, only part of which is shown.

FIG. 2 is a side view of one of the release mechanisms shown in FIGURE 1 with one of the bracket plates removed.

FIG. 3 is a fragmentary section taken along line 3—3 of FIG. 2.

FIG. 4 is similar to FIG. 2, but with the mechanism parts shown in their released positions.

FIG. 5 is a view similar to FIG. 2, showing a modified form of release mechanism embodying the invention.

FIG. 6 is a fragmentary sectional view taken along line 6—6 of FIG. 5.

FIG. 7 is an enlarged, fragmentary view of the release mechanism shown in FIG. 5, with the outer bracket plate in place.

FIG. 8 is a view similar to FIG. 2 showing another modified form of release mechanism embodying the invention.

FIG. 9 is a fragmentary section taken along line 9—9 of FIG. 8.

FIG. 10 is a view similar to FIG. 8, showing the parts of the release mechanism in their released positions.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to FIG. 1, there is shown a multi-bottom or gang plow 10 mounted on the draft links 11 of a tractor 12, only a portion of which is shown. The plow 10 includes a plurality of plow bottoms 13, each carried by a plow standard 14. An overload release mechanism 15 constructed in accordance with the present invention couples each of the plow standards 14 to a rearwardly extending beam 16 which is the draft load bearing member of the plow frame.

Since all of the overload release mechanisms 15 are identical, only one will be considered in the following discussion, but it will be understood that each of the plow bottoms 13 is held in operative position by a similar mechanism.

Turning now to FIGS. 2, 3 and 4 and a single overload release mechanism 15, the associated plow standard 14 is pivoted at 21 near its upper end on a bracket made up of a pair of bracket plates 22, 23 which are secured rigidly to, and extend downwardly from, the plow beam 16. It can thus be seen that the plow bottom, which is mounted on the lower portion of the standard 14, may swing rearwardly about the pivot point 21 so that the bottom is not damaged when drawn against an underground obstruction.

In order to establish a normal, operative position for the plow standard 14, a stop in the form of a bolt 24 is passed through the plates 22, 23 so as to form positioning abutment against which the upper end of the plow standard 14 may rest. The overload release mechanism 15 is effective to hold the plow standard against the stop bolt 24 until the plow bottom at the lower end of the standard encounters a predetermined force, at which time the standard is released so that it may freely swing the plow bottom carried thereby rearwardly without subjecting the bottom to possible damage.

In accordance with the present invention, the mechanism 15 includes a pivoted, unitary latch engaging the upper end of the plow standard 14, the latch being resiliently deformable by the torque imposed on the standard under overload conditions, and guiding means are provided for positively pivoting the latch to release the standard incident to the former's resilient deformation under a predetermined overload. Preferably, the latch takes the form of a U-shaped, resilient member having one end pivoted between the bracket plates and the other end resisting movement of the standard from its operating position. Thus, a force tending to swing the standard will deform or bend the latch by varying the spacing between its ends.

Turning more particularly to the first embodiment of the invention illustrated in FIGS. 2, 3 and 4, a U-shaped latch member 30 is pivoted at 31 between the plates 22, 23. A guiding means 32 engages the free end of the latch member and is effective to pivot the latch after it is deformed or bent a predetermined amount. In addition, a positioning spring 33 is employed for urging the member 30 into latching position so that the standard will remain latched until overload occurs.

In order to engage and latch the standard 14, the U-shaped latch member 30 has a bifurcated end, between the opposite portions of which a latching roller 35 is journaled (see FIG. 3). The roller 35 is adapted to seat within a latching notch 36 formed in the upper end of the standard 14 (see FIG. 4). It can thus be seen that when the parts are in their latched, operating position, shown in FIG. 2, the roller 35 is fitted within the notch 36 and any tendency of the plow standard 14 to swing about its pivot 21 away from the stop bolt 24 is resisted by the latch member 30.

The member 30 is preferably formed of a tough resilient material such as spring steel, and thus the exertion of a strong force on the plow standard 14 tending to separate the standard from its stop bolt 24 will bend or deflect the member 30 so as to separate its opposite ends; that is, the roller 35 will be carried away from the pivot point 31 when the standard 14 is subjected to a turning force.

In this embodiment, the means 32 for positively pivoting the latch member 30 from its latching position following a predetermined amount of deflection, takes the form of a release link 40 coupling the bracket plates 22, 23 and the bifurcated end of the latch member 30. The link 40 is pivoted to the member 30 by a pin 41 and is provided at its other end with a bolt 42 which passes loosely through a pair of slots 43 in the respective plates 22, 23.

The link 40 and the slots 43 are proportioned so that after a predetermined amount of deflection of the latch member 30, the latching roller 35 is positively lifted from the notch 36 so as to release the standard 14. That is, when the standard 14 is forced about its pivot 21 so as to carry the roller 35 away from the pivot 31, the bolt 42 moves into engagement with the lower ends of the slots 43. Upon continued movement of the standard 14, the end of the latch member 30 carrying the roller 35 is lifted relative to the standard by the link 40, so as to disengage the roller 35 from the notch 36.

It will be appreciated that only a slight pivoting movement of the latch member 30 is sufficient to raise the center of the roller 35 above the edge of the notch 36. As soon as the roller 35 is thus overcentered, the standard will quickly cam the roller 35 and the latch member 30 upwardly about the pivot point 31 so as to completely free the standard. This upward movement of the latch member 30 and the release link 40 is permitted by the slots 43. As can be seen in FIG. 4, even though the latch member 30 is no longer deflected, the bolt 42 may ride up the slots 43 so that the member 30 and its link 40 will carry the roller 35 completely clear of the notch 36.

Preferably, the positioning spring 33 is in the form of a cantilever supported leaf spring secured to a spacer 45 that is fitted between the bracket plates 22, 23. The spring is tensioned to exert a downward force on the latch member 30. Thus, when the plow standard 14 has been swung clear of the roller 35, the spring 33 swings the latch member 30 back into its latching position. It will be appreciated that the member 30 remains in this position against the urging of the spring 33 through the engagement of the bolt 42 with the bottom portions of the slots 43.

In order to re-latch the standard 14, the latter is provided with a cam surface 46 on its upper end adjacent the latching notch 36. When the standard 14 is swung back into its operating position, the cam surface 46 engages the roller 35 and swings the latch member 30 about its pivot 31 against the resistance of the positioning spring 33 until the notch 36 is brought under the roller 35 so that the latter may re-enter the notch and latch the standard in operating position.

It will be understood that the bending deflection of a U-shaped, resilient element such as the latch member 30 is precisely related to the amount of force applied to the member. Since the release link 40 and the slots 43 can be proportioned to lift the roller 35 from the notch 36 after the member 30 has been deflected a predetermined amount, it will be appreciated that the overload release mechanism 15 can be set to operate only after an exactly predetermined force is applied to the plow bottom.

Furthermore, it will be seen that although a relatively strong force is required to deflect the latch member 30 and release the standard 14, it is relatively easy to re-latch the standard after it has been released. This merely involves swinging the latch member 30 about its pivot 31 against the resistance of the light positioning spring 33 without the necessity of again bending the latch member. Those skilled in the art will thus appreciate that the overload release mechanism 15 provides a very strong latching force while permitting the releasing load to be precisely determined. In addition, the mechanism is easily restored to its latched position.

Although the pivot 31 is illustrated in the form of a journaled pin, it will be appreciated that other expedients could be adopted for pivoting one end of the latch member 30 without departing from the invention.

It is a further feature of the invention that the bracket plates 22, 23 and the standard 14 are formed so that an edge of the standard is aligned with one of the side edges of the bracket plates when the standard is in latched, operating position against the stop bolt 24. In this way, a solid appearing structure is presented having a substantially unbroken forward wall without trash-collecting recesses. Thus, foreign materials will not become wedged in between the bracket plates and jam the overload release mechanism. In order to complete the unbroken forward wall formed by the plates 22, 23 and the standard 14, a spacer element 47 is fitted between the plates and up against the overlying plow beam 16.

It will also be apparent that the spacer 47, together with the front edge of the standard 14, the bracket plates 22, 23, the rear spacer 45, and the overlying portion of the plow beam 16, form a box-like enclosure encompassing and shielding the operating parts of the overload release mechanism. In this way, the mechanism is not subject to accidental damage, nor are these operating elements exposed to flying debris usually associated with the operation of farm equipment. The release mechanism may therefore be depended upon to perform reliably, even after long periods of non-use.

Turning to the first alternate embodiment of the invention, as illustrated in FIGS. 5, 6 and 7, it will be observed that structural elements similar or identical to those described above have been given the same identifying numerals with the distinguishing suffix *a* added. In this embodiment, the overload release mechanism 15a is mounted between a pair of spaced bracket plates 22a, 23a, which are secured to the plow beam 16a. The plow bottom, not shown, is mounted at the lower end of a plow standard 14a which is pivoted near its upper end at 21a between the bracket plates 22a, 23a. When in operating position, the upper end of the standard 14a abuts against a stop bolt 24a.

The standard is held in operating position by a generally U-shaped latching member 30a, which is pivoted at 31a to the bracket plates 22a, 23a, and which carries a latching roller 35a at its free end. The roller 35a fits in a notch formed in the top of the standard 14a so that when the standard swings away from the stop bolt 24a, the latch member 30a is deflected and spread.

In this embodiment, the means for pivoting the latch member 30a following a predetermined amount of deflection so that the standard is released, includes a laterally extending projection on the end of the member 30a preferably taking the form of an axle 50 for the roller 35a. The axle 50 extends outwardly through a pair of openings 51, 52 formed in the bracket plates 22a, 23a, respectively. The lower edges of the openings 51, 52 are shaped to define cam surfaces 53, 54, respectively, which cooperate with the laterally extending ends of the roller axle 50.

When in operation, an obstructing force on the plow bottom swings the standard 14a away from its stop bolt 24a so as to deflect the latch member 30a and draw the roller 35a toward the right in FIGS. 5 and 7. After a predetermined amount of deflection, the cam surfaces 53, 54 act against the roller axle 50 so as to raise the roller and thus swing the latch member 30a upwardly about its pivot 31a until the roller 35a is lifted from the latching notch in the top of the standard 14a. It will be noted that the openings 51, 52 are sufficiently large to permit the roller 35a to swing upwardly of the member 30a and completely clear the end of the standard 14a.

Re-latching of the overload release mechanism 15a is accomplished in the same manner as described above in connection with the mechanism 15. That is, a positioning spring 33a resiliently holds the latch member 30a down into latching position and a cam surface 46a is formed on the top of the standard 14a. The surface 46a lifts the roller 35a and permits it to drop into the latching notch when the standard is returned to its operating position against the stop bolt 24a.

Turning next to the second alternate embodiment of the invention, illustrated in FIGS. 8, 9 and 10, it will be noted that elements corresponding to those already described have been given identical reference numerals with the distinguishing suffix b added. In this embodiment, the overload release mechanism 15b includes a pair of spaced bracket plates 22b, 23b, secured to and extending downwardly from a plow beam 16b. A plow bottom, not shown, is mounted on the bottom portion of a plow standard 14b which is pivoted at 21b between the bracket plates 22b, 23b. The standard 14b is held in operating position against a stop surface 60, formed as the bottom of a spacer 45b, by a U-shaped latch member 30b.

In this embodiment, the latch member 30b is pivoted at 31b and is arranged to sandwich a latching roller 35b between an arcuate abutment surface 61 formed on the end of the member 30b and an opposed arcuate abutment surface 62 formed on the upper end of the plow standard 14b. It will thus be seen that a strong force tending to swing the plow standard 14b away from the stop surface 60 will deflect or bend the latch member 30b in a manner tending to move the abutment surface 61 toward the pivot point 31b.

In order to pivot the latch member 30b, and thus release the standard 14b, after a predetermined amount of deflection has occurred, the ends of the roller 35b extend laterally through openings 51b and 52b which are formed with lower cam surfaces 53b, 54b, respectively. It will thus be understood that after a force on the lower end of the standard 14b causes a predetermined amount of deflection of the latch member 30b, the roller 35b will be carried into contact with the cam surfaces 53b, 54b, whereupon the roller will be lifted and the latch member 30b swung upwardly about its pivot 31b so as to release the standard 14b.

Re-setting of the overload release mechanism 15b is similar to that described above in connection with the other embodiments. That is, a positioning spring 33b resiliently urges the latch member 30b down into latching position and the arcuate abutment surface 61 on this member in turn forces the roller 35b down into its latching position. The upper end of the standard 14b is provided with a cam surface 46b which, when the standard is swung back into operating position against the stop surface 60, causes the roller 35b to be lifted so that it will drop into latching engagement with the abutment surface 62.

For the purpose of keeping the roller 35b positioned within the openings 51b, 52b, a pair of retaining discs 65, 66, are secured at opposite ends of the roller by a bolt 67. The discs 65, 66 slide loosely on the outer surfaces of the bracket plates 22b, 23b, respectively, and serve to keep the roller 35b properly located.

It will be understood that while the several embodiments of the overload release mechanism of the present invention have been illustrated in connection with a multi-bottom plow, such mechanisms could be advantageously employed with other types of ground-engaging implements.

It will also be understood that the advantages discussed in some detail in connection with the first embodiment, release mechanism 15, are equally applicable to the alternate embodiments. That is, each of the mechanisms 15, 15a and 15b, provides a strong, resilient latching force derived from the deflection of a generally U-shaped member. In each case, the latch is positively released when a predetermined force is applied to the plow standard, the force being represented by a predetermined deflection of the U-shaped member. Each of the above described embodiments may also be easily re-set, and the latching mechanisms of each embodiment are shielded and protected.

I claim as my invention:

1. In an agricultural implement having a draft beam adapted to be coupled to a tractor and a ground-engaging tool arranged on the beam for being drawn through the ground by the tractor, an overload release mechanism for avoiding damage to the tool if it is drawn against an obstruction, comprising, in combination, a bracket rigidly secured to said beam, an implement standard carrying the ground-engaging tool at its lower end, said standard being pivoted on said bracket at a point spaced from its upper end so as to permit the standard and the tool to swing rearwardly from an operating position, said standard having a latching notch at its upper end, a U-shaped latching member pivoted on said bracket at one end and having a notch-engaging roller at its other end, and resilient means for pivoting said member to a latching position wherein said roller enters said notch and locks said standard in operating position so that a force tending to swing the standard back from its operating position will spread the ends of said U-shaped member, said bracket defining a cam surface for engaging said roller when said member is spread a predetermined amount so as to pivot the member and lift the roller from said notch, whereby the standard is released from its operating position and is free to swing rearwardly.

2. In an agricultural implement having a draft beam adapted to be coupled to a tractor and a ground-engaging tool arranged on the beam for being drawn through the ground by the tractor, an overload release mechanism for avoiding damage to the tool if it is drawn against an obstruction, comprising, in combination, a bracket rigidly secured to said beam, an implement standard carrying the ground-engaging tool at its lower end, said standard being pivoted on said bracket at a point spaced from its upper end so as to permit the standard and tool to swing rearwardly from an operating position, said standard having a latching abutment at its upper end, a U-shaped latching member pivoted on said bracket at one end and having an abutment-engaging element at the other end, resilient means for pivoting said member to a latching position wherein said element engages said abutment and locks said standard in operating position so that a force tending to move the standard back from its operating position will stress the ends of said U-shaped member, and means on said bracket for pivoting said member, and thus lifting said element clear of said abutment, after the member is stressed a pre-determined amount so that the standard is thereby released from its operating position and freed for rearward swinging movement.

3. In an agricultural implement having a draft beam adapted to be coupled to a tractor and a ground-engaging tool arranged on the beam for being drawn through the ground by the tractor, an overload release mechanism for avoiding damage to the tool if it is drawn against an obstruction, comprising, in combination, a bracket rigidly secured to said beam, an implement standard carrying the ground-engaging tool at its lower end, said standard being pivoted on said bracket at a point spaced from its upper end so as to permit the standard and tool to swing rearwardly from an operating position, said standard having a latching abutment at its upper end, a U-shaped latching member pivoted on said bracket at one end and having an abutment-engaging roller pivoted at the other end, and resilient means for pivoting said member to a latching position wherein said roller engages said abutment and locks said standard in operating position so that a force tending to move the standard back from its operating position will compress the ends of said U-shaped member, said bracket defining a cam surface for engaging said roller when said member is compressed a predetermined amount so as to pivot the member and lift the roller from said notch, whereby the standard is released from its operating position and is free to swing rearwardly.

References Cited in the file of this patent
UNITED STATES PATENTS

| | | |
|---|---|---|
| 2,722,877 | Altgelt | Nov. 8, 1955 |
| 2,775,182 | Silver | Dec. 25, 1956 |
| 3,011,565 | Cahow | Dec. 5, 1961 |
| 3,022,835 | Jennings | Feb. 27, 1962 |